H. J. EBNER.
MILK STRAINER AND SUPPORT THEREFOR.
APPLICATION FILED SEPT. 13, 1910.

1,015,946.

Patented Jan. 30, 1912.

WITNESSES:

INVENTOR
H. J. Ebner
BY
W. J. FitzGerald
Attorneys

UNITED STATES PATENT OFFICE.

HERMANN J. EBNER, OF PAIGE, TEXAS.

MILK-STRAINER AND SUPPORT THEREFOR.

1,015,946.  Specification of Letters Patent.  Patented Jan. 30, 1912.

Application filed September 13, 1910. Serial No. 581,755.

*To all whom it may concern:*

Be it known that I, HERMANN J. EBNER, a citizen of the United States, residing at Paige, in the county of Bastrop and State of Texas, have invented certain new and useful Improvements in Milk-Strainers and Supports Therefor; and I do hereby declare the following to be a full, clear, and exact description of the invention, such as will enable others skilled in the art to which it appertains to make and use the same.

My invention relates to new and useful improvements in milk strainers and supports therefor and my object is to provide a strainer of such construction as to prevent the splashing and spilling of milk as the same is poured therethrough.

A further object is to provide a support for the strainer which is adapted to rest on a separator supply tank, thereby obviating the necessity of a person holding the strainer thereover.

A still further object is to provide a device of simple and economical structure which shall be efficient in operation.

Other objects and advantages will be hereinafter referred to and more particularly pointed out in the specification and claim.

Figure 1:
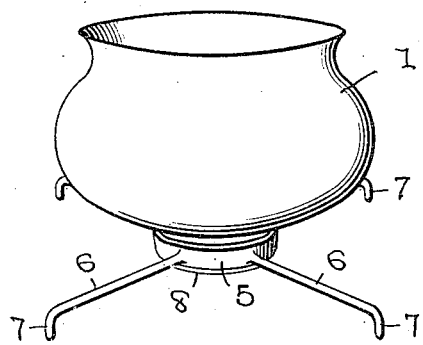
Figure 2:
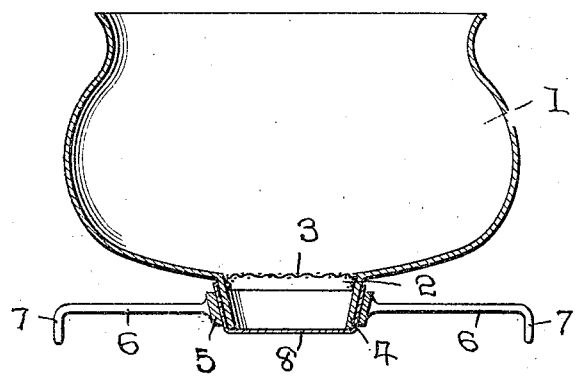

In the accompanying drawings forming a part of this application, Figure 1 is a perspective view of the strainer and support applied thereto, and, Fig. 2 is an enlarged transverse section therethrough.

Referring to the drawings in which similar reference numerals designate corresponding parts throughout the several views, 1 indicates a strainer of bowl-shape design, the walls of which are curved compoundly, the lower curve thereof being greater than the upper, whereby it will be seen that as milk is poured therein, the customary splashing will be obviated. The bottom of said strainer 1 is provided with an opening 2, over which is placed, in any preferred manner, a wire gauze 3; and an annular conical flange 4 integral with the bottom of said strainer, depends from the periphery of said opening 2, whereby the contents of said strainer may be guided into a separator supply tank or the like after the same has been strained through the wire gauze at the bottom of said strainer.

It is extremely inconvenient and laborious, to say the least, to hold the strainer over a receptacle while pouring the milk therein and to this end, I, therefore, provide a support for said strainer, comprising a band 5 having a conical wall and a plurality of integral supporting arms 6 radially disposed therefrom, which are adapted to rest upon a separator supply tank or other receptacle into which the milk is to be strained. Separator supply tanks are very often round and ofttimes square, as may be other receptacles into which milk is to be strained and to provide for the positive engagement of the arms 6 with the upper ends of said separators or receptacles, the outer ends of said arms are bent downwardly to form hook portions 7.

The strainer proper is supported over the receptacle or separator supply tank by inserting the depending annular flange 4 in the band 5 and, as, in this instance, the parts are of metal, the possibility of rust which will necessarily prevent the easy separation of the parts when the operation has been completed will be great, I provide a cloth or the like 8 which is to be inserted between the annular flange 4 and the band 5, which will not alone prevent the strainer from being held by the rust which may occur between the flange thereof and said band, but will act as a double strainer in conjunction with the wire gauze 3.

What I claim is:—

The combination with a receptacle having an opening in the bottom thereof, a wire gauze extending over said opening, and an annular flange integral with said receptacle and depending from the periphery of said opening, said flange being inclined inwardly; of a rigid band adapted to receive said flange, said band being disposed at an angle coincident to the inclination of said flange, said band and flange being adapted to clamp a cloth across the space surrounded by the flange, and supporting arms extending radially from said band.

In testimony whereof I have signed my name to this specification in the presence of two subscribing witnesses.

HERMANN J. EBNER.

Witnesses:
 F. HENRY URBAN,
 TOM ROWLETT.